United States Patent [19]

Okabe et al.

[11] Patent Number: 4,831,085
[45] Date of Patent: May 16, 1989

[54] FLUORINE CONTAINING POLYMERS AND COMPOSITIONS CONTAINING SAME

[75] Inventors: Jun Okabe; Akihiro Naraki; Masatoshi Abe; Haruyoshi Tatsu, all of Ibaraki, Japan

[73] Assignee: Nippon Mektron, Limited, Tokyo, Japan

[21] Appl. No.: 121,854

[22] Filed: Nov. 17, 1987

Related U.S. Application Data

[63] Continuation-in-part of Ser. No. 040,791, Apr. 21, 1987, abandoned.

[30] Foreign Application Priority Data

May 7, 1986 [JP] Japan .................. 61-104551

[51] Int. Cl.$^4$ .................. C08C 19/04; C08F 8/00
[52] U.S. Cl. .................. 525/387; 525/326.3
[58] Field of Search .............. 526/247; 525/387, 326.3

[56] References Cited

U.S. PATENT DOCUMENTS

| 3,306,879 | 2/1967 | Pattison | 260/77.5 |
| 3,351,619 | 11/1967 | Warnell | 260/80.76 |
| 4,035,565 | 7/1977 | Apotheker et al. | 526/247 |
| 4,262,101 | 4/1981 | Harwimmer et al. | 526/247 |
| 4,546,157 | 10/1985 | Nakagawa et al. | 526/247 |
| 4,564,662 | 1/1986 | Albin | 526/252 |

FOREIGN PATENT DOCUMENTS

| 0055407 | 7/1982 | European Pat. Off. | 526/247 |
| 0153848 | 9/1985 | European Pat. Off. | 526/247 |
| 0224037 | 6/1987 | European Pat. Off. | 526/247 |
| 53-4115 | 2/1978 | Japan . | |
| 54-1585 | 1/1979 | Japan . | |
| 60-195113 | 10/1985 | Japan . | |

Primary Examiner—Joseph L. Schofer
Assistant Examiner—N. Sarofim
Attorney, Agent, or Firm—Fred Philpitt

[57] ABSTRACT

This invention relates to a fluorine containing polymer as well as a curable composition containing the polymer and an organic peroxide. The fluorine containing polymer consists of a copolymer of (1) 3-bromoperfluoropropyl perfluorovinyl ether or 2-bromoperfluoropropyl perfluorovinyl ether, and (2) a fluorine containing monomer of 2 to 8 carbon atoms copolymerizable with said perfluoropropyl perfluorovinyl ether, the content of said perfluoropropyl perfluorovinyl ether in said copolymer being less than 5 mol %.

6 Claims, No Drawings

FLUORINE CONTAINING POLYMERS AND COMPOSITIONS CONTAINING SAME

RELATED APPLICATION

This application is a continuation-in-part of application Ser. No. 40,791 filed on Apr. 21, 1987 now abandoned, and since the present application is being filed during the pendency of Ser. No. 40,791 the benefits afforded by 35 USC 120 are claimed with respect to it.

FIELD OF THE INVENTION

This invention relates to fluorine containing polymers and compositions containing the same and curable with organic peroxides.

BACKGROUND OF THE INVENTION

Fluororubber is excellent in physical properties such as heat resistance, solvent resistance or chemical resistance in comparison with common rubber compositions, and used for making such products, for example, as hoses, tubes, sealants or the like by taking advantage of this excellent physical property. Such fluororubber is obtained in most cases by curing fluorine containing polymers with organic peroxides.

Known generally as fluorine containing polymers curable with organic peroxides are polymers obtained by copolymerizing bromine containing monomers with fluorine containing monomers while introducing the bromine atoms into the main chain of the polymers. Such fluorine containing polymers have usually been cross-linked to have three-dimentional cross-linked structure by allowing the bromine atom introduced into the main chain to radically undergo elimination addition.

For instance, Japanese Patent Publn. No. 1585/1979 discloses fluorine containing polymers obtained by copolymerizing (1) olefin containing less than 3% of bromine with (2) fluorine containing monomers having 2-7 carbon atoms to give copolymers containing at least 0.05% by weight of bromine. Further, Japanese Patent Publn. No. 4115/1978 discloses fluorine containing polymers obtained by copolymerizing (1) less than 3 mol% of 4-bromo-3,3,4,4-tetrafluorobutene-1 or bromotrifluoroethylene with (2) tetrafluoroethylene and perfluoroalkyl perfluorovinyl ether containing $C_1$-$C_5$ alkyl to give copolymers containing at least 0.05% by weight of bromine. Furthermore, Japanese Laid-Open-to-Public Publn. No. 195113/1985 discloses fluorine containing polymers obtained by copolymerizing monomers represented by ROCX=CYZ (1 or 2 out of X, Y and Z is bromine or iodine and the rest is hydrogen, fluorine or chlorine).

The fluorine containing polymers disclosed in the above-mentioned publications, however, contain bromine atoms active to organic peroxides, said bromine atoms have been introduced into the main chain or very stiff side chains of the polymer. On that account, there was such a problem that no cross-linked fluorine containing polymers found to be satisfactory in physical properties such as compression set, elongation, tensile strength, 100% modulus, etc. are obtained.

In the case of the monomers represented by ROCX=CYZ as disclosed in Japanese Laid-Open-to Public Publn. No. 195113/1985, moreover, there was also such a problem that a number of process steps are required for preparing such monomers, taking a great deal of time.

U.S. Pat. No. 3,351,619 Specification, on one hand, discloses fluorine containing polymers obtained by polymerizing iodinated fluoroalkyl containing vinyl ethers, and U.S. Pat. No. 3,306,879 Specification discloses fluorine containing polymers obtained by polymerizing 2-bromoethyl vinyl ether or 2-iodoethyl vinyl ether. In these cases, however, there were such problems that fluorine containing polymers which contain iodine atoms are inferior in photostability and that such hydrocarbon vinyl ethers containing no fluorine atoms as bromoethyl vinyl ethers are inferior in heat resistance, copolymerizability, etc.

The present inventors extensively studied with the view of solving such problems mentioned above as associated with the prior art, and have eventually accomplished the present invention on the basic of their finding that fluorine containing polymers having introduced bromine atoms active to organic peroxides into not the main chain or stiff side chaines but into the side chain having pliability are found, when cross-linked with organic peroxides, to have quite excellent characteristics in physical properties such as elongation, tensile strength, compression set, etc.

OBJECT OF THE INVENTION

The present invention is to solve various problems associated with the prior art as aforesaid, and an object of the invention is to provide cross-linked fluorine containing polymers which, when cross-linked with organic peroxides, are found to be quite excellent in physical properties such as elongation, tensile strength compression set, by a simplified production step that can be practiced by the use of monomers having excellent copolymerizability. Another object of the invention is to provide such fluorine containing polymers as mentioned above and compositions containing the same and crosslinkable with organic peroxides.

SUMMARY OF THE INVENTION

The fluorine containing polymers of the present invention are copolymers of (1) 3-bromoperfluoropropyl perfluorovinyl ether or 2-bromoperfluoropropyl perfluorovinyl ether, and (2) fluorine containing monomers of 2 to 8 carbon atoms copolymerizable with said perfluoropryl perfluorovinyl ether, characterized in that said perfluoropropyl perfluorovinyl ether is present in an amount of less than 5 mol% in the copolymer.

Furthermore, the fluorine containing polymer compositions of the present invention are characterized by comprising

[A] a copolymer of (1) 3-bromoperfluoropropyl perfluorovinyl ether or 2-bromoperfluoropropyl perfluorovinyl ether, and (2) a fluorine containing monomer having 2 to 8 carbon atoms copolymerizable with said perfluoropropyl perfluorovinyl ether, the content of said perfluoropropyl perfluorovinyl ether in said copolymer being less than 5 mol%, and

[B] 0.1–10% by weight, based on said copolymer [A], of an organic peroxide.

The fluorine containing polymers of the present invention, when crosslinked with organic peroxides, give cross-linked fluorine containing polymers excellent in physical properties such as elongation, tensile strength, compression set, etc. Furthermore, since the present fluorine containing polymers are prepared by using monomers excellent in copolymerizability, it is possible to make the process for the preparation thereof efficient and simple.

DESCRIPTION OF THE INVENTION

The fluorine containing polymers and fluorine polymer containing compositions containing the same prepared in accordance with the present invention are illustrated hereinafter.

The present fluorine containing polymers are copolymers of (1) 3-bromoperfluoropropyl perfluorovinyl ether or 2-bromoperfluoropropyl perfluorovinyl ether, and (2) fluorine containing monomers of 2–8 carbon atoms copolymerizable with said perfluoropropyl perfluorovinyl ether, the polymeric unit resulting from 3-bromoperfluoropropyl perfluorovinyl ether or 2-bromoperfluoropropyl perfluorovinyl ether being present in an amount of less than 5 mol% in said fluorine containing polymers.

In the present invention, it is preferable to use 3-bromoperfluoropropyl perfluorovinyl ether as vinyl ether since the fluorine containing polymers obtained thereby come to have various characteristics such as excellent elongation, tensile strength, compression set, etc.

Usable as fluorine containing monomers of 2–8 carbon atoms copolymerizable with the above-mentioned perfluoropropyl perfluorovinyl ethers containing bromine are tetrafluoroethylene, chlorotrifluoroethylene, vinylidene fluoride, hexafluoropropene, pentafluoropropene, perfluoroalkyl perfluorovinyl ethers (such as perfluoromethyl perfluorovinyl ether, perfluoroethyl perfluorovinyl ether, perfluoropropyl perfluorovinyl ether, etc.), trifluoroethylene, vinyl fluoride and hexafluoroisobutene. These fluorine containing monomers may be used in admixture of two or more. When two or more fluorine containing monomers are used in this manner, the fluorine containing polymers obtained are found to be terpolymers, quadripolymers or polymers composed of more than four components.

As the fluorine containing monomers of 2–8 carbon atoms copolymerizable with the aforesaid perfluoropropyl perfluorovinyl ethers, there can also be used fluorine containing diene monomers in combination with the above-mentioned fluorine containing monomers, and in that case there are obtained fluorine containing polymers excellent in processability (extrudability, kneadability).

Useful fluorine containing diene monomers as mentioned above include perfluoro-1,3-butadiene, perfluoro-1,4-pentadiene, 1,1,2-trifluoro-1,3-butadiene, 1,1,2-trifluoro-1,4-pentadiene, 1,1,2,3,3-pentafluoro-1,4-pentadiene, perfluoro-1,7-octadiene, perfluorodivinyl ether, perfluorovinyl perfluoroallyl ether, vinyl perfluoroallyl ether, perfluorovinyl allyl ether and the like.

The amount of the above-mentioned fluorine containing diene monomer used is desirably less than about 1 mol% based on the fluorine containing monomer or monomers used in combination therewith. When the amount of fluorine containing diene monomer used is larger than that mentioned above, the fluorine containing polymer obtained is subject to marked gelation and consequently they undesirably detriorate is processability (flow characteristics) and elongation.

In the present invention, fluorine containing polymers are obtained by copolymerization of (1) such vinyl ethers as aforementioned and (2) fluorine containing monomers copolymerizable therewith. Under certain circumstances, however, such olefinic monomers containing no fluorine copolymerizable with the above-mentioned monomers, for example, as ethylene and propylene, can also be copolymerized.

In the fluorine containing polymers obtained in accordance with the present invention, the polymeric unit resulting from 3-bromoperfluoropropyl perfluorovinyl ether or 2-bromoperfluoproyl perfluorovinyl ether is desirably present in an amount of less than 5 mol%, preferably 0.01 to 2.0 mol%, in said polymers. The presence, if any, of the polymeric unit exceeding 5 mol% is not preferable, because stability at the time of polymerization deteriorates and processability also deteriorates, with the result that the cured product obtained finally comes to be inferior in rubber elasticity (elongation) and heat resistance.

The present fluorine containing polymers are obtained by solution or emulsion polymerization, according to conventionally known methods, of 3-bromoperfluoropropyl perfluorovinyl ether or 2-bromoperfluoropropyl perfluorovinyl ether and fluorine containing monomers of 2–8 carbon atoms copolymerizable therewith in the presence of sources of radical formation.

The polymerization temperature employed is usually in the range of from $-30°$ to $150°$ C., though no particular limitation is placed thereon so long as a radical reaction proceeds and no depolymerization of the resulting polymer takes place. The polymerization pressure employed is usually in the range of from 1 to 100 kg/cm$^2$, though a wide range of pressures may be employed, without particular limit, according to the desired polymerization rate and polymerization degree.

When the present fluorine containing polymers are intended to be obtained by solution polymerization, the polymerization reaction is carried out using such polymerization initiators, for example, organic peroxides, fluorine containing organic peroxides, organic azo compounds and fluorine containing organic azo compounds in such polymerization solvents less in chain transferability as perfluoro(1,2-dimethylcyclobutane), perfluoro(1,2-dichloroethane), perfluoro(1,2,2-trichloroethane), perfluorocyclohexane, perfluorotributylamine, α, ω-dihydroperfluoropolymethylene, perfluoro(methoxypolyethoxyethane), perfluorocyclobutane and tert-butanol.

When the present fluorine containing polymers are intended to be obtained by emulsion polymerization, the polymerization initiators used therefor are water-soluble polymerization initiators, for example, inorganic peroxides such as persulfates, hydrogen peroxide and perchlorates, and organic peroxides such as tert-butylhydroperoxide and disuccinylperoxide. The above-mentioned inorganic peroxides may also be used as redox polymerization initiators by using them in combination with such reducing agents as sulfites, hyposulfites and ascorbic acid. In order to adjust a molecular weight of the resulting polymer, such chain transfer agents as methanol, ethanol, isopentane, ethyl acetate, diethyl malonate and carbon tetrachloride may be used if necessary. For the purpose of attaining stable dispersion of polymer particles in the polymer solution, increasing the polymer concentration or preventing the polymer from attaching to the polymerization vessel, there are used fluorine containing carboxylates or such surfactants as fluorine containing sulfonates. These compounds are not always used, however, if the resulting polymer has an appropriate surface active effect.

The fluorine containing curable polymer compositions obtained in accordance with the present invention are illustrated hereinafter.

The fluorine containing polymers as obtained according to the present invention can be cured by crosslinking with organic peroxides, and accordingly the fluorine containing polymer compositions of the present invention are composed of [A] fluorine containing polymers as mentioned above and [B] 0.1–10% by weight, based on said polymers, of organic peroxides.

The fluorine containing polymers obtained in accordance with the present invention can be crosslinked and cured by various known curing methods, for example, peroxide curing method using organic peroxides, polyamine curing method using polyamines compounds and polyol curing method using polyhydroxy compounds. Of these methods mentioned above, particularly preferable is the peroxide curing method since the cured fluorine containing polymers are excellent in mechanical strength and also in heat resistance, chemical resistance and solvent resistance because the crosslinking site of the resulting polymers come to have a stable structure consisting of carbo-carbon bond. Furthermore, the present fluorine containing polymers are also curable by means of radiation rays or electron beams.

In this peroxide curing method, any organic peroxides are usable so long as they form peroxy radicals under the curing conditions, for example, 2,5-dimethyl-2,5-bis(tert-butyl-peroxy)hexane, 2,5-dimethyl-2,5-bis(-tert-butylperoxy)hexine-3, benzoyl peroxide, bis(2,4-dichlorobenzoyl)peroxide, dicumylperoxide, di-tert-butylperoxide, tert-butylcumylperoxide, tert-butylperoxy benzene, 1,1-bis(tert-butylperoxy)-3,5,5-trimethylcyclohexane, 2,5-dimethylhexane-2,5-dihydroxyperoxide, α,α'-bis(tert-butyl-peroxy)-p-diisopropyl benzene, 2,5-dimethyl-2,5-di(benzoylperoxy)hexane and tert-butylperoxyisopropyl carbonate. In the peroxide curing method, polyfunctional unsaturated compounds are usually used as crosslinkers in combination with the organic peroxides for the purpose of obtaining more excellent curing characteristics, mechanical strength and compression set. Useful crosslinkers for the purpose intended include, for example, triallylisocyanurate, trimethallyl isocyanurate, triallyl cyanurate triallyl trimethlitate, N,N'-phenylenebismaleimide, diallyl phthalate, tris(diallylamine)-s-triazine, triallylphosphite, 1,2-polybutadiene, ethylene diacrylate and diethyleneglycol diacrylate.

The amounts of the organic peroxides and cocrosslinkers usually used, based on 100 parts by weight of the fluorine containing polymers are desirably about 0.1–10, preferably about 0.5–5 parts by weight, and about 0.1–10, preferably about 0.5–5 parts by weight, respectively.

Furthermore, there can also be used oxides or hydroxides of divalent metals as crosslinking aids, for example calcium, magnesium, lead and zinc, according to the purpose. These crosslinker aids will act as acid acceptors, however, they may not be used according to the particular purposes. The amount of the cocrosslinkers, if used, is desirably less than 15 parts by weight based on 100 parts by weight of the fluorine containing polymers.

Furthermore, the curing system components may be mixed together and then kneaded, as they are, or may be dispersed and diluted with carbon black, silica, clay, talc, diatomaceous earth, barium sulfate or the like, or may be used after forming them into a master batch dispersion. Still further, in addition to these components, there can be suitably added conventionally known fillers, reinforcing materials, plasticizers, lubricants, processing aids, pigments, etc. The present fluorine containing polymers, moreover, can also be subjected to blend and cocrosslink with other substances having peroxide crosslinkability, for example, silicone oil, silicone rubber, fluorosilicone rubber, fluorophosphazene rubber, ethylene/vinyl acetate copolymer, ethylene/acrylate copolymer, ethylene/propylene rubber, acrylonitrile/butadiene rubber and acrylate rubber.

Generally, the fluorine containing polymers are mixed with the above-mentioned curing system components and various additives mentioned above by commonly adopted mixing techniques such as roll mixing, kneader mixing, Banbury mixing and solution mixing, and the mixture is then cured by heating. A primary curing is carried out generally at a temperature of about 100°–250° C. for about 1–120 minutes, and a secondary curing is effected at a temperature of about 150°–300° C. for about 0–30 hours.

The fluorine containing polymers obtained in accordance with the present invention can be effectively used in every field of application as aforementioned because they are excellent in processability and, at the same time, they are greatly improved in curing characteristics during peroxide curing and physical properties (mechanical strength, elongation, heat resistance, compression set, etc.) of cured product.

EFFECT OF THE INVENTION

The fluorine containing polymers of the present invention, when crosslinked with organic peroxides, give crosslinked fluorine containing polymers quite excellent in physical properties such as elongation, tensile strength, compression set, etc. Since the present fluorine containing polymers are prepared by using monomers excellent in copolymerizability, the process for the preparation thereof can be carried out in an efficiet and simplified manner.

The present invention is illustrated below with reference to examples, but it should be construed that the invention is in no way limited to those examples.

REFERENTIAL EXAMPLE 1

Preparation of 3-bromoperfluoropropyl perfluorovinyl ether

To an autoclave charged with 272 g (1.2 mol) of 3-bromoperfluoropropionyl fluoride (hereinafter called 3-BPF for short), 24 g (0.21 mol) of tetramethyl urea (hereinafter called TMU for short) and 100 ml of diglyme 166 g (1.0 mol) of hexafluoropropene oxide (HFPO) was added proportion-wise with stirring. The resultant mixture was separated into an upper layer and a lower layer, and the lower layer was isolated therefrom.

This lower layer was distilled to obtain 267.2 g (0.68 mol) of 3-bromoperfluoropropoxypropionic acid fluoride (BPPF).

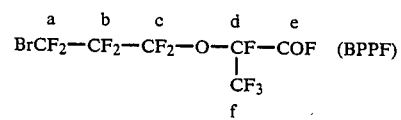

F-NMR of this BPPF was measured using CF₃COOH as an external standard.

F-NMR a: -12 ppm, b: 55 ppm, c: 5 ppm, d: 56 ppm, e: -97 ppm, f: 4 ppm.

39.3 g (0.1 mol) of BPPF thus obtained was added dropwise to a slurry, comprising 42.4 g (0.4 mol) of Na₂CO₃ and 200 ml of diglyme and kept at 80°–90° C., and thereafter the temperature was elevated up to 150° C. to withdraw a distillate therefrom under reduced pressure. The ditillate was separated into an upper layer and a lower layer, and the lower layer was dispensed to obtain 17.0 g (0.05 mol) of 3-bromoperfluoropropoxy perfluorovinyl ether (3-BPVE).

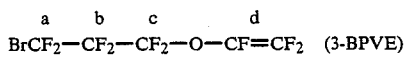

F-NMR of this BPVE was measured likewise.

F-NMR a: -11.5 ppm, d: 43, 50, 64 ppm. b: 53.5 ppm, c: 6 ppm,

REFERENTIAL EXAMPLE 2

Preparation of 2-bromoperfluoropropyl perfluorovinyl ether

2-Bromoperfluoropropoxy perfluorovinyl ether (2-BPVE) was prepared in the same manner as in Referential Example 1 except that 2-bromoperfluoropropionyl fluoride (2-BPF) was used in place of the 3-bromoperfluoropropionyl fluoride (3-BPF).

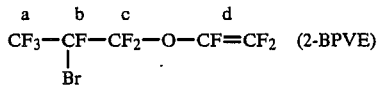

F-NMR a: 6 ppm, d: 42, 51, 63.5 ppm. b: 28 ppm, c: 8.5 ppm,

EXAMPLE 1

In a 3 l autoclave were charged 1500 ml of deionized water, 5 g of hexafluoroisopropanol (HFiPA) and 7.5 g of ammonium perfluorooctanoate, and the system was adjusted to pH about 10 with sodium hydroxide, followed by dissolving 1 g of ammonium persulfate therein. Thereafter, the atmosphere in the system was thoroughly flushed with N₂ and the autoclave was sufficiently cooled. The autoclave was then charged with 110 g of tetrafluoroethylene, 91.5 g of perfluoromethyl perfluorovinyl ether (FMVE), 247.5 g of vinylidene fluoride and 18.0 g of 3-BPVE, and polymerization was proceeded with stirring at 80° C. After the lapse of 24 hours, the autoclave was cooled, remaining gas was discharged, and the polymerization was suspended.

The aqueous emulsion obtained was subjected to coaggulation with saturated brine, and the solid product obtained was washed with water to obtain 406 g of a rubbery polymerizate. Yield was 87%.

This rubbery polymrizate, upon analysis, was found to be as follows:

Vinylidene fluoride/tetrafluoroethylene/FMVE = 68/21/11

(VDF)    (TFE)    (mole ratio)

This rubbery polymerizate had the bromine content of 0.62% by weight.

EXAMPLE 2

In a 3 l autoclave were charged 1500 ml of deionized water, 5 g of HFiPA and 7.5 g of ammonium perfluorooctanoate, and the system was adjusted to pH about 10 with sodium hydroxide, followed by dissolving 1 g of ammonium persulfate therein. Thereafter, the atmosphere in the system was thoroughly flushed with N₂ and the autoclave was sufficiently cooled. The autoclave was then charged with 110 g of tetrafluoroethylene, 146.3 g of perfluoromethyl perfluorovinyl ether (FMVE), 247.5 g of vinylidene fluoride and 18.0 g of 2-BPVE, and polymerization was proceeded with stirring at 80° C. After the lapse of 24 hours, the autoclave was cooled, remaining gas was discharged, and the polymerization was suspended.

The aqueous emulsion obtained was subjected to coaggulation with saturated brine, and the solid product obtained was washed with water to obtain 393 g of a rubbery polymerizate. Yield was 82%.

This rubbery polymerizate, upon analysis, was found to be as follows:

Vinylidene fluoride/tetrafluoroethylene/FMVE = 70/19/11

(VDF)    (TFE)    (Mole ratio)

This rubbery polymerizate had the bromine content of 0.53% by weight.

EXAMPLE 3

In a 3 l autoclave were charged 1500 ml of deionized water, 5 g of HFiPA and 7.5 g of ammonium perfluorooctanoate, and the system was adjusted to pH about 10 with sodium hydroxide, followed by dissoving 1 g of ammonium persulfate therein. Thereafter, the atmosphere in the system was thoroughly flushed with N₂ and the autoclave was sufficiently cooled. The autoclave was then charged with 110 g of tetrafluoroethylene, 146.3 g of perfluoropropyl perfluorovinyl ether (FPVE), 247.5 g of vinylidene fluoride and 18.0 g of 3-BPVE, and polymerization was proceeded with stirring at 80° C. After the lapse of 24 hours, the autoclave was cooled, remaining gas was discharged, and the polymerization was suspended.

The aqueous emulsion obtained was subjected to coaggulation with saturated brine, and the solid product obtained was washed with water to obtain 402 g of a rubbery polymerizate. Yield was 77%.

This rubbery polymerizate, upon analysis, was found to be as follows:

Vinylidene fluoride/tetrafluoroethylene/FPVE = 72/19/9

(VDF)    (TFE)    (Mole ratio)

This rubbery polymerizate had the bromine content of 0.34% by weight.

EXAMPLE 4

In a 3 l autoclave were charged 1500 ml of deionized water, 5 g of HFiPA and 7.5 g of ammonium pefluorooctanoate, and the system was adjusted to pH about 10 with sodium hydroxide, followed by dissolving 1 g of ammonium persulfate therein. Thereafter, the atmosphere in the system was thoroughly flushed with N₂ and the autoclave was sufficiently cooled. The autoclave was then charged with 55 g of tetrafluoroethylene, 183 g of perfluoromethyl perfluorovinyl ether (FMVE), 247.5 g of vinylidene fluoride and 18.0 g of 3-BPVE, and polymerization was proceeded stirring at 80° C. After the lapse of 24 hours, the autoclave was cooled, remaing gas was discharged, and the polymerization was suspended.

The aqueous emulsion obtained was subjected to coaggulation with saturated brine, and the solid product obtained was washed with water to obtain 428 g of a rubbery polymerizate. Yield was 85%.

This rubbery polymerization, upon analysis, was found to be as follows:

Vinylidene fluoride/tetrafluoroethylene/FMVE = 67/12/21

(VDF)    (TFE)    (Mole ratio)

This rubbery polymerizate had the bromine content of 0.47% by weight.

COMPARATIVE EXAMPLE 1

In a 3 l autoclave were charged 1500 ml of deionized water, 5 g of HFiPA and 7.5 g of ammonium perfluorooctanoate, and the system was adjusted to pH about 10 with sodium hydroxide, followed by dissolving 1 g of ammonium persulfate therein. Thereafter, the atomsphere in the system was thoroughly flushed with $N_2$ and the autoclave was sufficiently cooled. The autoclave was then charged with 110 g of tetrafluoroethylene, 146.3 g of perfluoropropyl perfluorovinyl ether (FPVE), 247.5 g of vinylidene fluoride and 8.9 g of bromotetrafluoroethylene (BTFE), and polymerization was proceeded with stirring at 80° C. After the lapse of 24 hours, the autoclave was cooled, remaining gas was discharged, and the polymerization was suspended.

The aqueous emulsion obtained was subjected to coaggulation with saturated brine, and the solid product was washed with water to obtain 364 g of a rubbery polymerizate. Yield was 87%.

This rubber polymerizate, upon analysis, was found to be as follows:

Vinylidene fluoride/tetrafluoroethylene/FPVE = 68/23/9

(VDF)    (TFE)    (Mole ratio)

This rubbery polymerizate had the bromine content of 0.26% by weight.

COMPARATIVE EXAMPLE 2

In a 3 l autoclave were charged 1500 ml of deionized water, 5 g of HFiPA and 7.5 g of ammonium perfluorooctanoate, and the system was adjusted to pH about 10 with sodium hydroxide, followed by dissolving 1 g of ammonium persulfate therein. Thereafter, the atmosphere in the system was thoroughly flushed with $N_2$ and the autoclave was sufficiently cooled. The autoclave was then charged with 110 g of tetrafluoroethylene, 146.3 g of perfluoropropyl perfluorovinyl ether (FPVE), 247.5 g of vinylidene fluoride and 11.3 g of bromotetrafluorobutylene (BTFB), and polymerization was proceeded with stirring at 80° C. After the lapse of 24 hours, the autoclave was cooled, remaining gas was discharged, and the polymerization was suspended.

The aqueous emulsion obtained was subjected to coaggulation with saturated brine, and the solid product obtained was washed with water to obtain 319 g of a rubbery polymerizate. Yield was 62%.

This rubbery polymerizate, upon analysis, was found to be as follows:

Vinylidene fluoride/tetrafluoroethylene/FPVE = 65/24/11

(VDF)    (TFE)    (Mole ratio)

This rubbery polymerizate had the bromine content of 0.31% by weight.

COMPARATIVE EXAMPLE 3

In a 3 l autoclave were charged 1500 ml of deionized water, 5 g of HFiPA and 7.5 g of ammonium perfluorooctanoate, and the system was adjusted to pH about 10 with sodium hydroxide, followed by dissolving 1 g of ammonium persulfate therein. Thereafter, the atmosphere in the system was thoroughly flushed with $N_2$ and the autoclave was sufficiently cooled. The autoclave was then charged with 110 g of tetrafluoroethylene, 91.5 g of perfluoropropyl perfluorovinyl ether (FPVE), 247.5 g of vinylidene fluoride and 17.8 g of iodoperfluoroethyl perfluorovinyl ether (IEVE, $CF_2=CFOCF_2CF_2I$) and polymerization was proceeded with stirring at 80° C. After the lapse of 24 hours, the autoclave was cooled, remaining gas was discharged, and the polymerization was suspended.

The aqueous emulsion obtained was subjected to coaggulation with saturated brine, and the solid product obtained was washed with water to obtain 203 g of a rubbery polymerizate. Yield was 39%.

This rubbery polymerizate, upon analysis, was found to be as follows:

Vinylidene fluoride/tetrafluoroethylene/FPVE = 67/21/12

(VDF)    (TFE)    (Mole ratio)

This rubbery polymerizate had the iodine content of 0.75% by weight.

COMPARATIVE EXAMPLE 4

In a 3 l autoclave were charged 1500 ml of deionized water, 5 g of HFiPA and 7.5 g of ammonium perfluorooctanoate, and the system was adjusted to pH about 10 with sodium hydroxide, followed by dissolving 1 g of ammonium persulfate therein. Thereafter, the atmosphere in the system was thoroughly flushed with $N_2$ and the autoclave was sufficiently cooled. The autoclave was then charged with 110 g of tetrafluoroethylene, 146.3 g of perfluoropropyl perfluorovinyl ether (FPVE), 247.5 g of vinylidene fluoride and 18.0 g of bromoperfluoroethyl perfluorovinyl ether (BEVE, $CF_2=CFOCF_2CF_2Br$), and polymerization was proceeded with stirring at 80° C. After the lapse of 24 hours, the autoclave was cooled, remaining gas was discharged, and the polymerization was suspended.

The aqueous emulsion obtained was subjected to coaggulation with saturated brine, and the solid product obtained was washed with water to obtain 422 g of a rubbery polymrizate. Yield was 81%.

This rubbery polymerizate, upon analysis, was found to be as follows:

Vinylidene fluoride/tetrafluoroethylene/EPVE = 71/21/8

(VDF)    (TFE)    (Mole ratio)

This rubbery polymerizate had the bromine content of 0.60% by weight.

The foregoing examples and comparative examples are summarized in Table 1.

EXAMPLE 6

Example 5 was repeated except that the rubbery fluorine containing polymer obtained in Example 2 was

TABLE 1

| | Vinylidene fluoride (g) | Tetrafluoroethylene (g) | Vinyl ether (g) | Br or I containing monomer (g) | Yield of rubbery polymer (g) | Composition of rubbery polymer | Bromine or iodine content (wt. %) |
|---|---|---|---|---|---|---|---|
| Example 1 | 247.5 | 110 | FMVE 91.5 | 3-BPVE 18.0 | 406 (87%) | 68/21/11 | 0.62 |
| Example 2 | 247.5 | 110 | FMVE 91.5 | 2-BPVE 18.0 | 393 (82%) | 70/19/11 | 0.53 |
| Example 3 | 247.5 | 110 | FPVE 146.3 | 3-BPVE 18.0 | 402 (77%) | 72/19/9 | 0.34 |
| Example 4 | 247.5 | 55 | FMVE 183 | 3-BPVE 18.0 | 428 (85%) | 67/12/21 | 0.47 |
| Comparative Example 1 | 247.5 | 110 | FPVE 146.3 | BTFE 8.9 | 364 (71%) | 68/23/9 | 0.26 |
| Comparative Example 2 | 247.5 | 110 | FPVE 146.3 | BTFB 11.3 | 319 (62%) | 65/24/11 | 0.31 |
| Comparative Example 3 | 247.5 | 110 | FPVE 146.3 | IEVE 17.8 | 203 (39%) | 67/21/12 | 0.75 |
| Comparative Example 4 | 247.5 | 110 | FPVE 146.3 | BEVE 15.2 | 422 (81%) | 71/21/8 | - |

Using a Ubbelohde's viscometer, the rubbery polymers obtained in the foregoing Examples 1–4 and Comparative Examples 1–4, respectively, were measured for viscosity $\eta sp/C$, dissolving each polymer in methyl ethyl ketone at 30° C. in an amount of 0.25 g/25 ml.

Solubility of each polymer in methyl ethyl ketone was also investigated.

The results obtained are shown in Table 2.

TABLE 2

| | $\eta$ sp/c | Solubility |
|---|---|---|
| Example 1 | 0.89 | ○ |
| 2 | 0.81 | ○ |
| 3 | 0.76 | ○ |
| 4 | 0.71 | ○ |
| Comparative Example 1 | 0.32 | X |
| 2 | 0.39 | X |
| 3 | 0.21 | X |
| 4 | 0.48 | ○ |

○: Completely soluble
X: Partly insoluble

EXAMPLE 5

A mixture comprising 100 parts by weight of the rubbery fluorine containing polymer obtained in Example 1, 20 parts by weight of MT-carbon, 1.5 parts by weight of 2,5-dimethyl-2,5-di(t-butylperoxy)hexane, and 4 parts by weight of triallyl isocyanurate was roll kneaded to prepare a fluorine containing curable polymer composition.

This composition was then press-cured at 160° C. for 10 minutes and was cured by heating at 180° C. for 4 hours in an oven to obtain a sheet-like cured product and an O-ring form cured product.

Physical properties of the cured products were measured according to JIS K-6310. Compression set was measured by subjecting P-24 O-ring of 3.5 mm in line diameter to 25% compression (at 200° C. for 70 hours).

The results are shown in Table 3.

used. The cured products obtained were measured for physical properties in the same manner as in Example 5.

The results are shown in Table 3.

EXAMPLE 7

Example 5 was repeated except that the rubbery fluorine containing polymer obtained in Example 3 was used. The cured products obtained were measured for physical properties in the same manner as in Example 5.

The results are shown in Table 3.

EXAMPLE 8

Example 5 was repeated except that the rubbery fluorine containing polymer obtained in Example 4 was used. The cured products obtained were measured for physical properties in the same manner as in Example 5.

The results are shown in Table 3.

COMPARATIVE EXAMPLE 5

Example 5 was repeated except that the rubbery fluorine containing polymer obtained in Comparative Example 1 was used. The cured products obtained were measured for physical properties in the same manner as in Example 5.

The results are shown in Table 3.

COMPARATIVE EXAMPLE 6

Example 5 was repeated except that the rubbery fluorine containing polymer obtained in Comparative Example 2 was used. The cured products obtained were measured for physical properties in the same manner as in Example 5.

The results are shown in Table 3.

COMPARATIVE EXAMPLE 7

Example 5 was repeated except that the rubbery fluorine containing polymer obtained in Comparative Example 3 was used. The cured products obtained were measured for physical properties in the same manner as in Example 5.

The results are shown in Table 3.

COMPARATIVE EXAMPLE 8

Example 5 was repeated except that the rubbery fluorine containing polymer obtained in Comparative Example 4 was used. The cured products obtained were measured for physical properties in the same manner as in example 5.

The results are shown in Table 3.

TABLE 3

|  | Hardness (JIS A) | 100% modulus | Tensile strength | Elongation | Compression Set | Processability | Rate of change in tensile strength |
|---|---|---|---|---|---|---|---|
| Example 5 | 65 | 60 | 157 | 262 | 31 | Good | −11 |
| Example 6 | 68 | 54 | 135 | 207 | 34 | Good | −15 |
| Example 7 | 67 | 51 | 148 | 230 | 32 | Good | −13 |
| Example 8 | 65 | 57 | 138 | 210 | 32 | Good | −12 |
| Comparative Example 5 | 65 | — | 42 | 90 | More than 100 | Good | −35 |
| Comparative Example 6 | Foamed and no sheet was prepared. | | | | | | |
| Comparative Example 7 | 75 | — | 40 | 45 | More than 100 | Good | −59 |
| Comparative Example 8 | 65 | 68 | 127 | 172 | 42 | Good | −20 |

What is claimed is:

1. A fluorine containing polymer consisting of a copolymer of (1) 3-bromoperfluoropropyl perfluorovinyl ether or 2-bromoperfluoropropyl perfluorovinyl ether, and (2) a fluorine containing monomer of 2 to 8 carbon atoms copolymerizable with said perfluoropropyl perfluorovinyl ether, the content of said perfluoropropyl perfluorovinyl ether in said copolymer being less than 5 mol%.

2. The fluorine containing polymer according to claim 1 wherein the fluorine containing monomer of 2 to 8 carbon atoms copolymerizable with the bromoperfluoropropyl perfluorovinyl ether is tetrafluoroethylene, chlorotrifluoroethylene, vinylidene fluoride, hexafluoropropene, pentafluoropropene or perfluoroalkyl perfluorovinyl ethers.

3. The fluorine containing polymer according to claim 1 wherein the content of said perfluoropropyl perfluorovinyl ether in said copolymer is 0.01 to 2.0 mol%.

4. A curable fluorine containing polymer composition comprising a copolymer [A] of (1) 3-bromoperfluoropropyl perfluorovinyl ether or 2-bromoperfluoropropyl perfluorovinyl ether, and (2) a fluorine containing monomer of 2 to 8 carbon atoms copolymerizable with said perfluoropropyl perfluorovinyl ether, the content of said perfluoropropylvinyl ether in said copolymer being less than 5 mol%, and [B] 0.1 to 10% by weight, based on the copolymer [A] of an organic peroxide.

5. The curable fluorine containing polymer composition according to claim 4 wherein the fluorine containing monomer of 2 to 8 carbon atoms copolymerizable with the bromoperfluoropropyl perfluorovinyl ether is tetrafluoroethylene, chlorotrifluoroethylene, vinylidene fluoride, hexafluoropropene, pentafluoropropene or perfluoroalkyl perfluorovinyl ethers.

6. The fluorine containing polymer according to claim 4 wherein the content of said perfluoropropyl perfluorovinyl ether in said copolymer is 0.01 to 2.0 mol%.

* * * * *